(12) United States Patent  
Ohkawa et al.

(10) Patent No.: US 7,212,124 B2
(45) Date of Patent: May 1, 2007

(54) PORTABLE INFORMATION DEVICE (75) Inventors: Takehiro Ohkawa, Tachikawa (JP); Hiroshi Yoshigi, Hinode (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 10/603,667

(22) Filed: Jun. 26, 2003

(65) Prior Publication Data

US 2004/0140896 A1 Jul. 22, 2004

(51) Int. Cl.
*G08B 13/14* (2006.01)

(52) U.S. Cl. ............... 340/572.7; 340/572.1; 340/572.4; 340/572.6

(58) Field of Classification Search ............ None
See application file for complete search history.

(56) References Cited

U.S. PATENT DOCUMENTS

| | | | | |
|---|---|---|---|---|
| 5,552,790 | A * | 9/1996 | Gunnarsson | 342/51 |
| 5,717,307 | A * | 2/1998 | Barkat et al. | 340/636.1 |
| 6,127,938 | A * | 10/2000 | Friedman | 340/693.6 |
| 6,535,107 | B1 * | 3/2003 | Bartz | 340/5.2 |
| 6,830,193 | B2 * | 12/2004 | Tanaka | 235/492 |
| 6,840,440 | B2 * | 1/2005 | Uozumi et al. | 235/375 |
| 6,965,866 | B2 * | 11/2005 | Klein | 705/1 |
| 2002/0174336 | A1 * | 11/2002 | Sakakibara et al. | 713/172 |
| 2005/0097038 | A1 * | 5/2005 | Yu et al. | 705/40 |

FOREIGN PATENT DOCUMENTS

| | | |
|---|---|---|
| EP | 1262932 A1 | 4/2002 |
| JP | 09-190938 | 7/1997 |
| JP | 2000-285214 | 10/2000 |
| WO | WO 02/056247 A1 | 7/2002 |

* cited by examiner

*Primary Examiner*—Daniel Wu
*Assistant Examiner*—Son Tang
(74) *Attorney, Agent, or Firm*—Antonelli, Terry, Stout & Kraus, LLP.

(57) ABSTRACT

Provided is a portable information device having an RFID, the device being a device in which no effect is produced on original communication of the portable information device for which an EMC measure is taken, the device having good productivity, and the device keeping communication distance without damaging portability. A place where an antenna is set is located on the side of a battery cover of a battery receiving section to make the communication distance of an incorporated RFID long. A circuit configuration wherein a condenser for resonance is connected to both ends of the antenna coil and an IC is connected to an intermediate tap of the antenna coil is made so as to make it unnecessary that the resonance frequency of the RFID is individually adjusted and make the production of the RFID easy. A magnetic material sheet is arranged between the antenna coil and a battery to ensure a magnetic circuit for causing a magnetic flux from an external apparatus to pass through the antenna coil of the RFID and make the Q of the resonance circuit high.

15 Claims, 8 Drawing Sheets

| | C(pF) | ⊿C(%) | fo(MHz) | ⊿f(%) |
|---|---|---|---|---|
| T1 (9/9) | 15 | −31.8 | 15.175 | +12.0 |
| | 22 | 0 | 13.548 | 0 |
| | 28 | +27.3 | 12.504 | −7.7 |
| T2 (3/9) | 15 | −31.8 | 13.653 | +3.4 |
| | 22 | 0 | 13.216 | 0 |
| | 28 | +27.3 | 12.872 | −2.6 |
| T3 (2/9) | 15 | −31.8 | 13.622 | +1.4 |
| | 22 | 0 | 13.453 | 0 |
| | 28 | +27.3 | 13.278 | −1.2 |

FIG.8

PORTABLE INFORMATION DEVICE

BACKGROUND OF THE INVENTION

1. Field of the Invention

The present invention relates to a portable information device, in particular, a portable information device on which an RFID (radio frequency identification) for making communication with an external apparatus through magnetic field signals is mounted.

2. Description of the Related Art

An example wherein an RFID is mounted, which is one of automatic recognition techniques for communicating ID (identification) data and various data to an external apparatus, using a magnetic field having a given frequency and radiated from the external apparatus as a signal carrier wave, is the so-called non-contact IC card, such as an IC telephone card or an electronic ticket. In the case that an RFID is mounted on a portable information device and is used, it is indispensable to ensure communication distance. It is required to exclude the effect of obstacles on a magnetic circuit for this.

It is known for this purpose to arrange a flexible magnetic material having a permeability of 100 or more about an excitation frequency of 100 KHz or less proximately to the rear of a loop antenna as a measure for being not affected by any magnetic circuit obstacle with ease (see, for example, Document 1: JP-A No. 9-284038).

There is also known a product wherein a flexible magnetic material is arranged proximately to a loop antenna in the same manner but the value of the relative permeability thereof is not specified (see, for example, Document 2: JP-A No. 2000-276565 and Document 3: JP-A No. 2001-68916).

There is also known a circuit for matching the input-impedance of an LSI with the output-impedance at an intermediate tap point of a resonance circuit composed of an antenna coil and capacitors connected to both ends thereof (the intermediate tap point may be positioned outside the resonance circuit dependently on the impedance) (See Document 4: JP-A No. 2000-278172.)

In order to make communication distance long, to make the resonance frequency of a receiver circuit of an RFID consistent with the frequency of a signal carrier wave from an external apparatus has been performed. For example, in RFIDs of a non contact type IC card, it is known to trim the use number of rows of fine condensers for resonance, which are made of printed patterns, in each of the RFIDs (See Patent document 5: JP-A No. 11-353440).

SUMMARY OF THE INVENTION

In the case of mounting, on a portable information device, an RFID using a magnetic field having a given frequency radiated from an external apparatus as a signal carrier wave, it is necessary to consider that a low impedance loop circuit on circuits of the portable information device is present on a magnetic circuit necessary for an antenna coil fitted to the RFID, or a metal vacuum-evaporation film or a conductive material coating is present on a case in order to take an electro-magnetic compatibility (EMC) measure.

Moreover, the size of the portable information device is limited from the viewpoint of the portability thereof, and the magnetic circuit opening area of its antenna coil cannot be made sufficiently large. For such reasons, there is caused a problem that the communication distance is made far shorter than communication in free space.

Additionally, setting an antenna coil for an RFID on a circuit of a portable information device causes a problem that original communication of the portable information device, which has an antenna for communication, (for example, transmit and receive of conversations in a portable telephone), is affected.

Furthermore, in the case that an RFID is mounted on a portable information device, it is necessary to make the resonance frequency of a receiver circuit of the RFID consistent with the frequency of the carrier wave from an external apparatus in order to make communication distance long. However, if it becomes necessary to adjust such RFIDs individually, the productivity is lowered, resulting in a rise in costs. In addition, it is very difficult to perform resonance frequency adjustment for each of RFIDs mounted on portable information devices. Thus, costs for the production rise.

However, in the above-mentioned Documents 1–4, the portable information device itself, into which an RFID is integrated, is a source for emitting electromagnetic waves which is provided with an antenna for communication, and it is not considered that an EMC measure is taken for its case in order that a bad effect may not be produced on other electronic devices or in order that the portable information device itself may not receive obstacles based on external noises. In Patent document 5, it is necessary to perform individual adjustments by the trimming of condensers. Even if the prior arts of Documents 1–5 are used as they are in order to cope with all of the above-mentioned problems, the problems cannot be solved.

Thus, an object of the present invention provide a portable information device having an RFID, the device being a device in which no effect is produced on original communication of the portable information device which has an antenna for communication and which is subjected to an EMC measure, the device having good productivity, and the device keeping communication distance without damaging portability.

The portable information device of the present invention is a portable information device comprising a battery receiving section and having an RFID for making communication using a magnetic field built-in, characterized in that an antenna coil of the RFID is arranged on the side of a battery cover for a battery in the battery receiving section, a magnetic material sheet is arranged between the antenna coil and the battery in the battery receiving section, and the device comprises an IC (integrated circuit) and condensers for resonance connected to the antenna coil. That is, communication distance from an external apparatus is ensured by a structure wherein an antenna coil of an RFID is arranged on the side of a battery cover of a battery receiving section, an EMC measure being not taken for the cover; there is disposed a magnetic material sheet which functions as a magnetic circuit having a low magnetic reluctance for introducing magnetic fluxes into the course of the antenna coil of the RFID and the battery; and an IC and a condenser for resonance are connected to the antenna coil.

In the above-mentioned portable information device, it is preferred to make a structure wherein the antenna coil of the RFID has an intermediate tap, the condensers for resonance are connected to both ends of the antenna coil, and the IC is connected to the middle between one of the ends of the antenna coil and the intermediate tap. This structure makes it possible to make small the effect of difference between the input terminal capacitances of ICs, based on a scattering in the production process of the ICs, on resonance frequency change.

In this case, it is advisable that the intermediate tap is an intermediate tap the number of turns of which is from ⅓ to ⅕ of the total number of turns of the antenna coil. This makes it possible to make small the effect of difference between the input terminal capacitances, based on a scattering in the production process of ICs, on resonance frequency change, and further make large the communication distance between the RFID and an external apparatus.

It is preferred that the magnetic material sheet has an initial permeability of 10 or more and a thickness of 0.1 mm or more and 1.0 mm or less. This makes it possible to ensure the communication distance up to an external apparatus.

Furthermore, a metal foil or a metal vacuum-evaporation film may be disposed between the magnetic material sheet and the battery. This makes it possible to make small the effect of individual variation in batteries or change in electrification situation on the resonance frequency, and further ensure the communication distance up to an external apparatus.

It is preferred that any one of the above-mentioned portable information devices further comprises an IC card, for both of contact and non-contact uses, which is connected to the antenna coil through a flexible substrate and a connector and is mounted on a position different from the position of the antenna coil. This makes it possible to widen the permission range for the IC used in the portable information device.

It is preferred in any one of the above-mentioned portable information devices that an EMC measure based on a metal vacuum-evaporation film or a conductive material coating is not applied to any member of the battery receiving section and the battery cover. This causes damping of a magnetic field between it and an external apparatus to be avoided and makes it possible to ensure the communication distance. Thus, the RFID functions satisfactorily.

DETAILED DESCRIPTION OF THE PREFERRED EMBODIMENTS

The following will describe preferred embodiments of the portable information device according to the present invention in detail, referring the attached drawings. In the description of the embodiments, a combination of a substrate, an antenna coil printed on this substrate, and a condenser for resonance and an IC connected to the antenna is called "RFID".

<Embodiment 1>

Figure 1A:
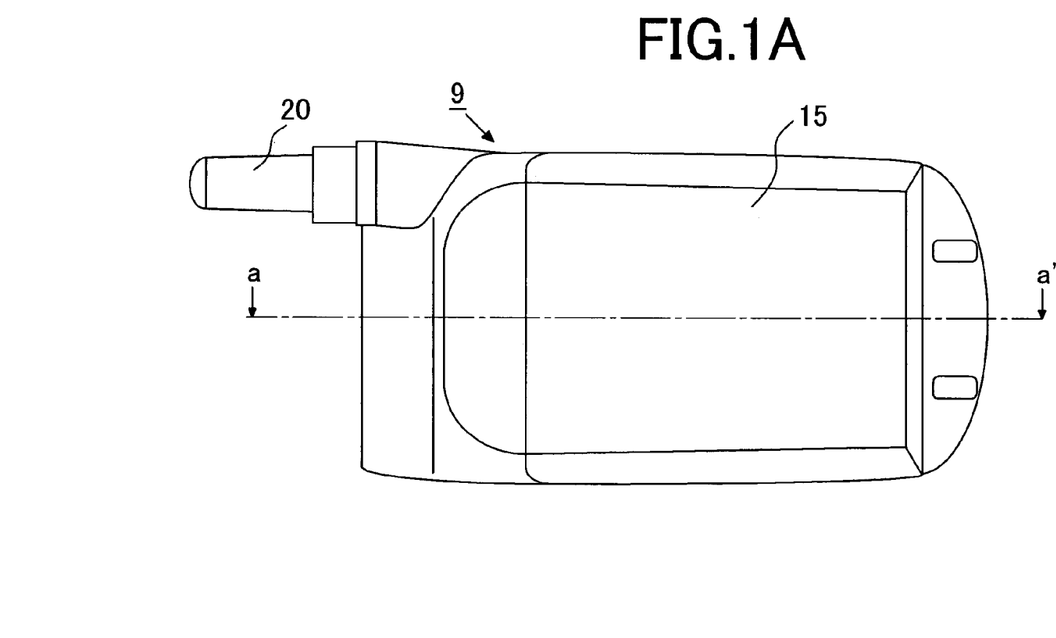
FIG. 1A is a bottom view of illustrating a first embodiment of the portable information device according to the present invention, in which the present invention is applied to a portable telephone.
Figure 1B:
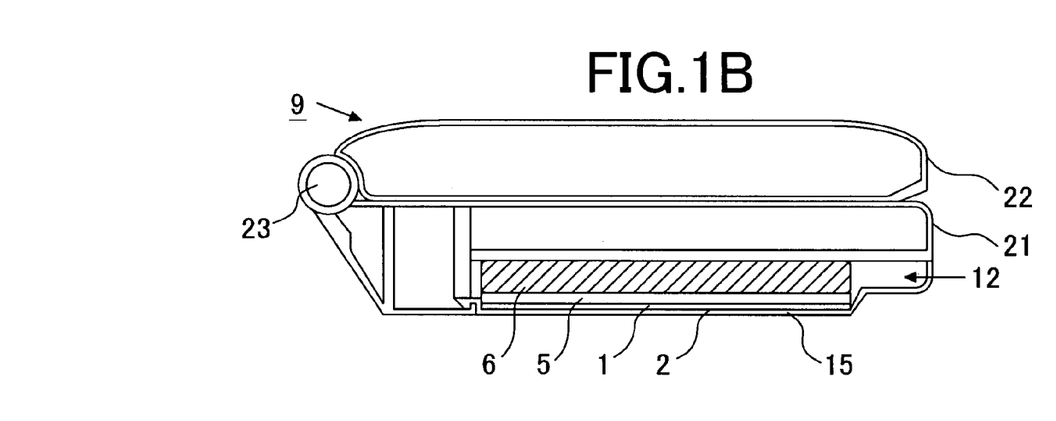
FIG. 1B is a sectional view of a portion along a–a' line shown in the bottom view of FIG. 1A.
Figure 1C:
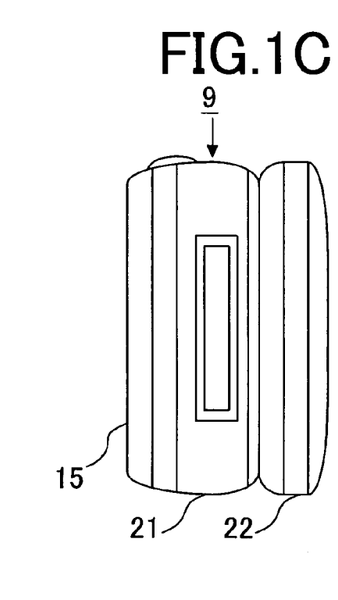
FIG. 1C is a right-side-hand figure viewed from the right side above the paper of FIG. 1A.

FIGS. 1A–1C are views illustrating a first embodiment of the portable information device according to the present invention, and are outline mounting figures of a case in which the present invention is applied to a portable telephone. FIG. 1A is a bottom view thereof, FIG. 1B is a sectional view of a portion along a–a' line shown in the bottom view of FIG. 1A, and FIG. 1C is a right-side-hand figure viewed from the right side above the paper of FIG. 1A.

In FIG. 1A, reference number 20 represents a primary or original antenna for communication of a portable telephone 9, 21 represents a lower side case having keys for inputting telephone numbers, name and so on, transmit and receive keys, a microphone, a data processing circuit for driving and controlling these, and other members, 22 represents an upper side case having a liquid crystal display section for displaying inputted numbers, received images, received mails, electric wave reception situation and so on, a speaker for listening received sounds, driving and controlling circuits thereof, and other members. The lower side case 21 and the upper side case 22 are opened or closed around a rotation axis 23 as a center.

The portable telephone 9 has a battery receiving section 12 including a battery cover 15 for taking in and out a battery. As illustrated in the sectional view of FIG. 1(B), in the battery receiving section 12, a magnetic material sheet 5 is sandwiched between a substrate 1 on which the antenna coil 2 of the RFID is printed and the battery 6. The antenna coil 2 is arranged on the side of the battery cover 15, that is, outside the battery 6.

In a general portable telephone, for an EMC measure, a metal vacuum-evaporation film or a conductive material coating is applied to its case except its battery cover. Therefore, if no measure is taken to arrange the antenna coil 2 of the RFID inside the case, a received electric field becomes weak so that communication with an external apparatus is not easily made. That is, a problem that the communication distance of the RFID becomes extremely short is caused.

Thus, the inventors paid attention to the fact that the case of the battery 6 itself in the battery receiving section 12 is made of metal. Namely, the case of the battery itself can be used for an EMC measure so that it is unnecessary to take any EMC measure in the battery receiving section. Accordingly, it has been found out that if in a portable telephone any metal vacuum-evaporation film or electric-conduction material paint for an EMC measure is excluded from only the battery cover of the battery receiving section and an antenna coil is arranged on the side of this battery cover, an EMC measure is satisfied and further communication with an external apparatus, based on a magnetic field, can be realized even if the RFID is mounted.

Thus, in the present embodiment, no metal vacuum-evaporation film or electric-conduction material paint is applied to the battery cover 15.

Figure 2:
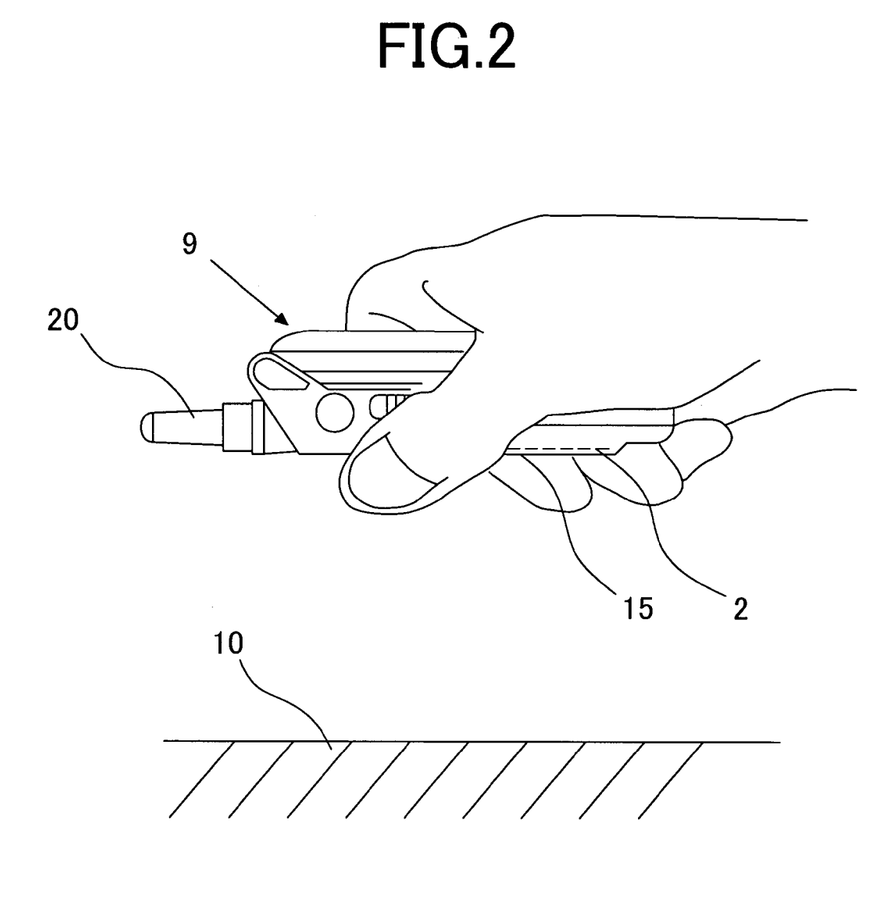
FIG. 2 is a schematic view in which the RFID-mounted portable telephone illustrated in FIG. 1B is put over and near an external apparatus.

FIG. 2 is a view wherein the RFID-mounted portable telephone 9 illustrated in FIG. 1 is put over and near an electron ticket inspection machine 10 as an external apparatus, and communication is made between the antenna coil 2 of the RFID positioned at the lower inner side of the battery cover 15 of the portable telephone 9 and the electron ticket inspection machine 10, using a magnetic field.

Figure 3:
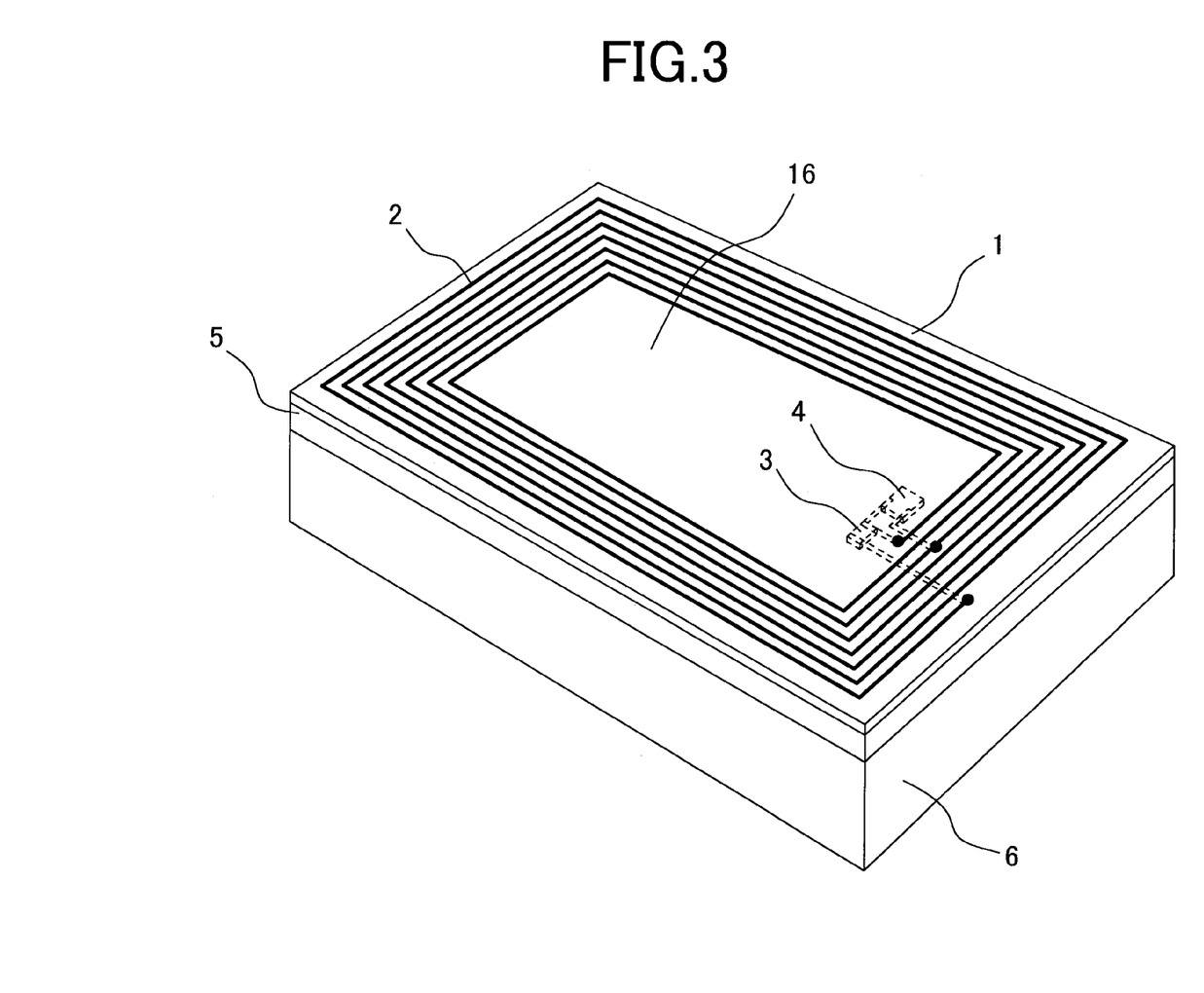
FIG. 3 is a perspective view of an arrangement relationship between the battery and members which constitute the RFID illustrated FIGS. 1B.

FIG. 3 illustrates only an arrangement relationship between the battery 6 and members which constitute the RFID, in which the lower and upper side cases 21 and 22, the rotation axis 23 and the inner structure of the portable telephone 9 are omitted in order to make the RFID parts illustrated in FIG. 1B easy to understand. In FIG. 3, the antenna coil 2 is printed on the substrate 1 so as to have a rectangular and spiral pattern. An IC 4 and a condenser 3 for resonance connected to this antenna coil 2 are mounted on the substrate 1, and a magnetic material sheet 5 is sandwiched between the RFID and the battery 5.

Herein, in the IC 4, for example, the following are integrated: a circuit for converting an alternating current power from the external apparatus to a direct electric current power in order to drive circuits of the IC itself; a circuit for extracting signals from the external apparatus; a circuit for conducting processing for sending signals corresponding to the signals back to the external apparatus; a circuit for conducting processing for carrying the sent-back signals onto the antenna coil; and other circuits.

Portions of the magnetic material sheet 5 where the IC 4 and the condenser 3 for resonance are mounted are hollowed out, which is not illustrated in FIG. 3 since the figure becomes complicated.

A magnetic flux emitted from the electron ticket inspection machine 10 as the external apparatus, which is arranged at the upper part of the figure but is not illustrated, passes through an opening 16 in the antenna coil 2 printed on the substrate 1, and subsequently almost all thereof passes through the magnetic material sheet 5 having a small magnetic reluctance, thereby forming a magnetic circuit passing through the opening 16 in the antenna coil 2 printed on the substrate 1. The thickness and the area of the battery receiving section 12 of the RFID-mounted portable telephone 9 cannot be made very thick or very large, considering practical portability. It can be said that if the thickness of the magnetic material sheet 5 is 1 mm or less, the thickness does not produce an effect on the size of portable telephones under the present situation.

In the case that the frequency of the magnetic field used in the RFID is set to, for example, 13.56 MHz and the communication distance up to the external apparatus is set to at least 10 cm in the present embodiment, a magnetic material sheet having a thickness of 0.1 mm to 1 mm is used as the magnetic material sheet 5 to make it possible to ensure a communication distance up to the external apparatus without damaging the portability of the portable telephone 9 if the initial permeability of the magnetic material sheet 5 is 10 or more. If the initial permeability becomes smaller than 10, the thickness of the magnetic material sheet 5 becomes 2 mm or more so as to affect the portability.

In the case that there is no magnetic material sheet 5, the magnetic flux is affected by the interval between the antenna coil 2 and the battery 6 to hinder the formation of a magnetic circuit. For example, in order to form the same magnetic circuit as in the case that the magnetic material sheet having an initial permeability of 20 and a thickness of 1 mm is used, it is necessary that the interval between the antenna coil 2 and the battery 6 is about 6 mm. Thus, the thickness of the RFID-mounted portable telephone 9 becomes large so that the portability becomes bad and the practical utility becomes insufficient. It is therefore necessary to set the magnetic material sheet 5 having a permeability of 10 or more between the RFID and the battery 6.

The resonance frequency $f_0$ of the RFID is changed dependently on the individual variation and the charge state of the battery 6. However, this effect can also be made small by setting the magnetic material sheet 5 between the RFID and the battery 6.

In the case that there is no magnetic material sheet 5, the interval between the antenna coil 2 and the battery 6 becomes large as described above and additionally the resonance frequency change based on the individual variation and the charge state of the battery 6 gets remarkable even if the interval between the antenna coil 2 and the battery 6 is large. Thus, the telephone becomes impractical.

In FIG. 3, the battery 6, the magnetic material sheet 5 and the substrate 1 are illustrated to have the same size. However, it is necessary only to make the size of the magnetic material sheet 5 larger than the external shape of the antenna coil 2, and it is unnecessary to make the size consistent with the size of the battery 6.

Figure 4:
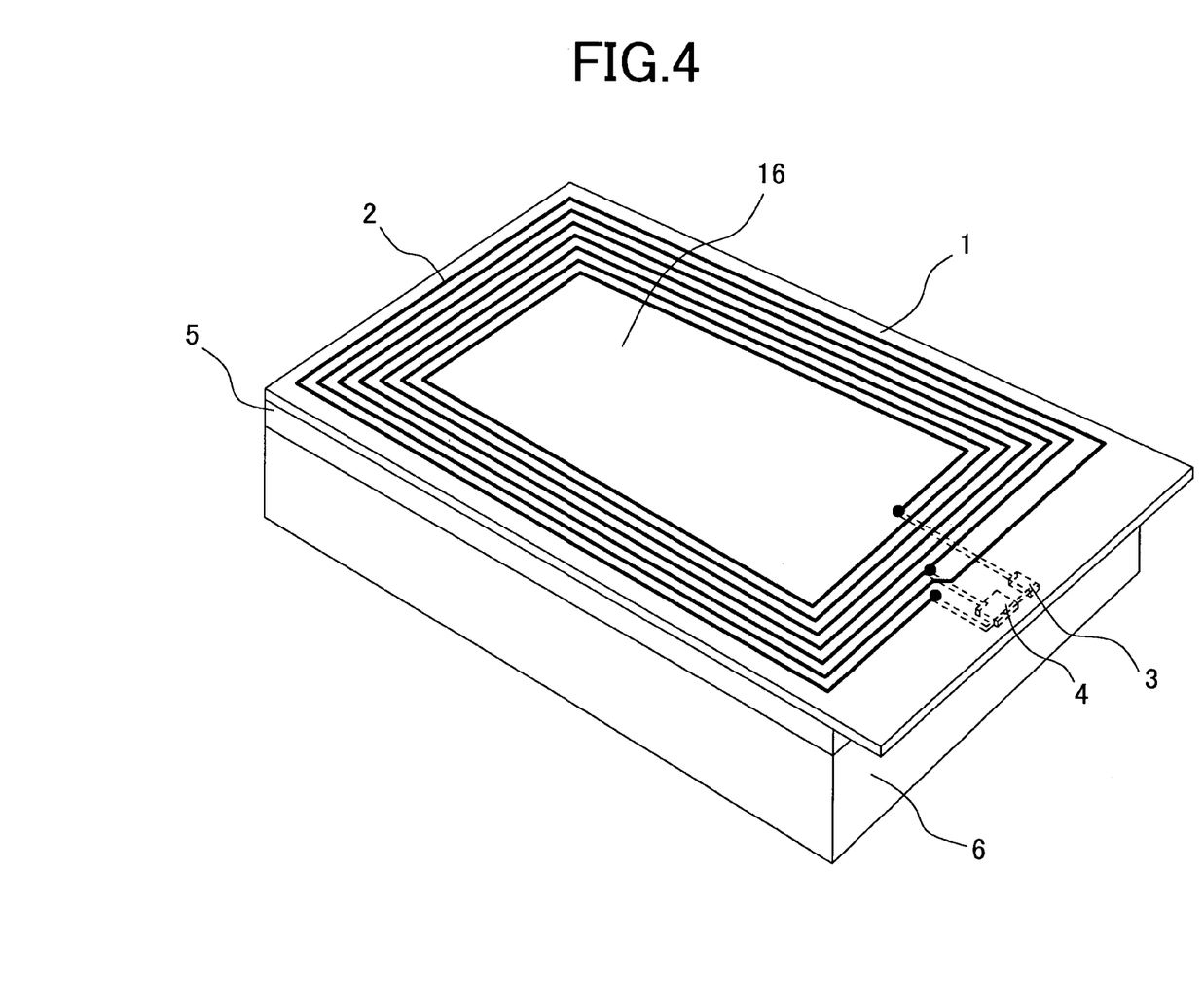
FIG. 4 is a perspective view of another arrangement example of the battery and members which constitute the RFID illustrated FIGS. 3.

As illustrated in FIG. 4, it is allowable to arrange the IC 4 and the condenser 3 for resonance, connected to the antenna coil 2 printed on the substrate 1, outside the edge of the magnetic material sheet 5 in order to make the mounting easy.

The following will describe the construction of the resonance circuit composed of the antenna coil 2, the condenser 3 for resonance, and the IC 4 used in the present embodiment.

Figure 7A:
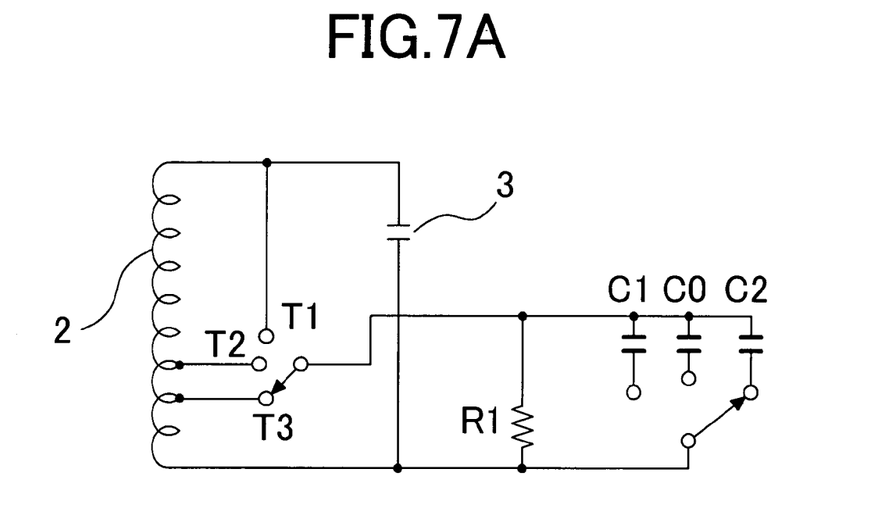
FIG. 7A is a view of a circuit for measuring intermediate tap position, connected to an IC, of an antenna coil of an RFID mounted on a portable information device according to the present invention, and a view of resonance frequency characteristic based on the input-capacitance error of the IC.
Figure 7B:
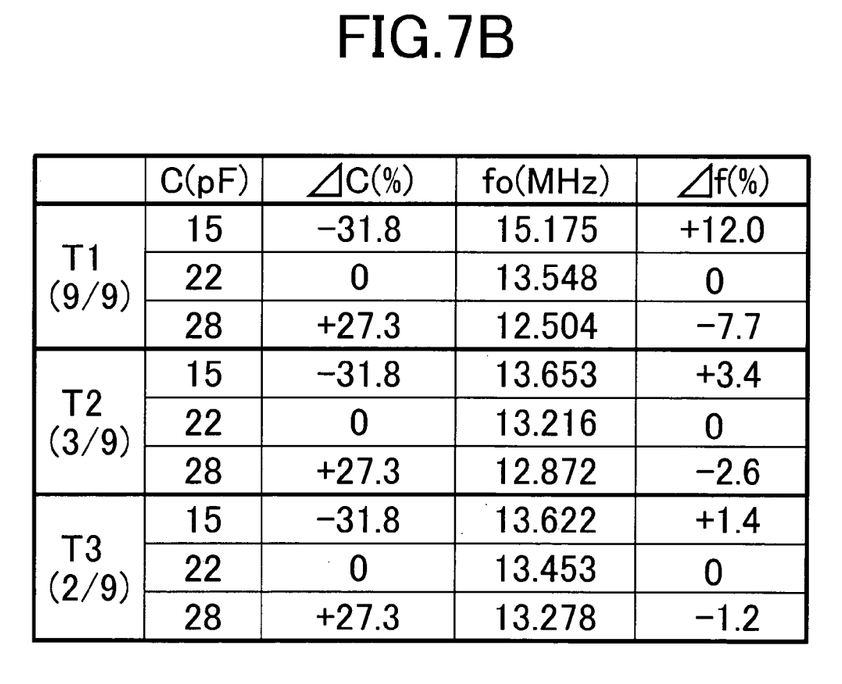
FIG. 7B is a table of measured results.

FIG. 7A is an experimental circuit in which there was measured an effect of input-capacitance error ÄC, of the IC 4, based on the position of the intermediate tap connected to the IC 4 of the antenna coil 2 in the present embodiment, on the resonance frequency $f_0$, and FIG. 7B is a table of actually measured data.

As illustrated in FIG. 7A, there was used, as a standard in the experimental circuit, a parallel circuit of a resistance R1 of 2.2 KÙ and a condenser C0 of 22 pF corresponding to the resistance and the input-capacitance equivalent to the IC 4, which was a load connected to the intermediate tap of the antenna coil 2 wherein the number of total turns was 9, so as to measure change Äf in the resonance frequency $f_0$ in the case that the condenser C0 of 22 pF was substituted with a condenser C1 of 15 pF and a condenser C2 of 28 pF.

The value of the resonance condenser 3 for setting the resonance frequency was adjusted in the case that the parallel circuit of the resistance R1 of 2.2 kÙ and the condenser C0 of 22 pF, as a substitute for the IC 4, were made up to a load.

In FIG. 7B, T1, T2 and T3 are tap positions illustrated in FIG. 7A, and each of fractions, 9/9, 9/3 and 2/9 in parentheses represents the ratio of T/N wherein the number of turns at the tap position is represented by T and the number of total turns is represented by N. Furthermore, C represents the capacitance value (pF) of each condenser, ÄC represents the difference (%) from the capacitance value of the standard condenser C0, $f_0$ represents the resonance frequency (MHz), and Äf represents the frequency error (%) from the resonance frequency $f_0$.

As is evident from the Table shown in FIG. 7B, it can be understood that in the case of using the intermediate tap position T2 or T3, the error Äf of the resonance frequency was varied only within the range of about ±3.5% even if the input-capacitance error ÄC was varied within the range of about ±30%, as compared with the case of the position T1, in which no intermediate position was used. Accordingly, by using the intermediate tap, it is possible to largely relieve direct effect of the input-capacitance error, (which appears to be usually ±20% or less), of the IC 4 generated in the production process or the like on the change Äf in the resonance frequency $f_0$. Thus, the adjustment of each individual RFID for matching the resonance frequency $f_0$ can be made unnecessary. In short, the adjustment of each of RFIDs can be made to non-adjustment.

Figure 8:
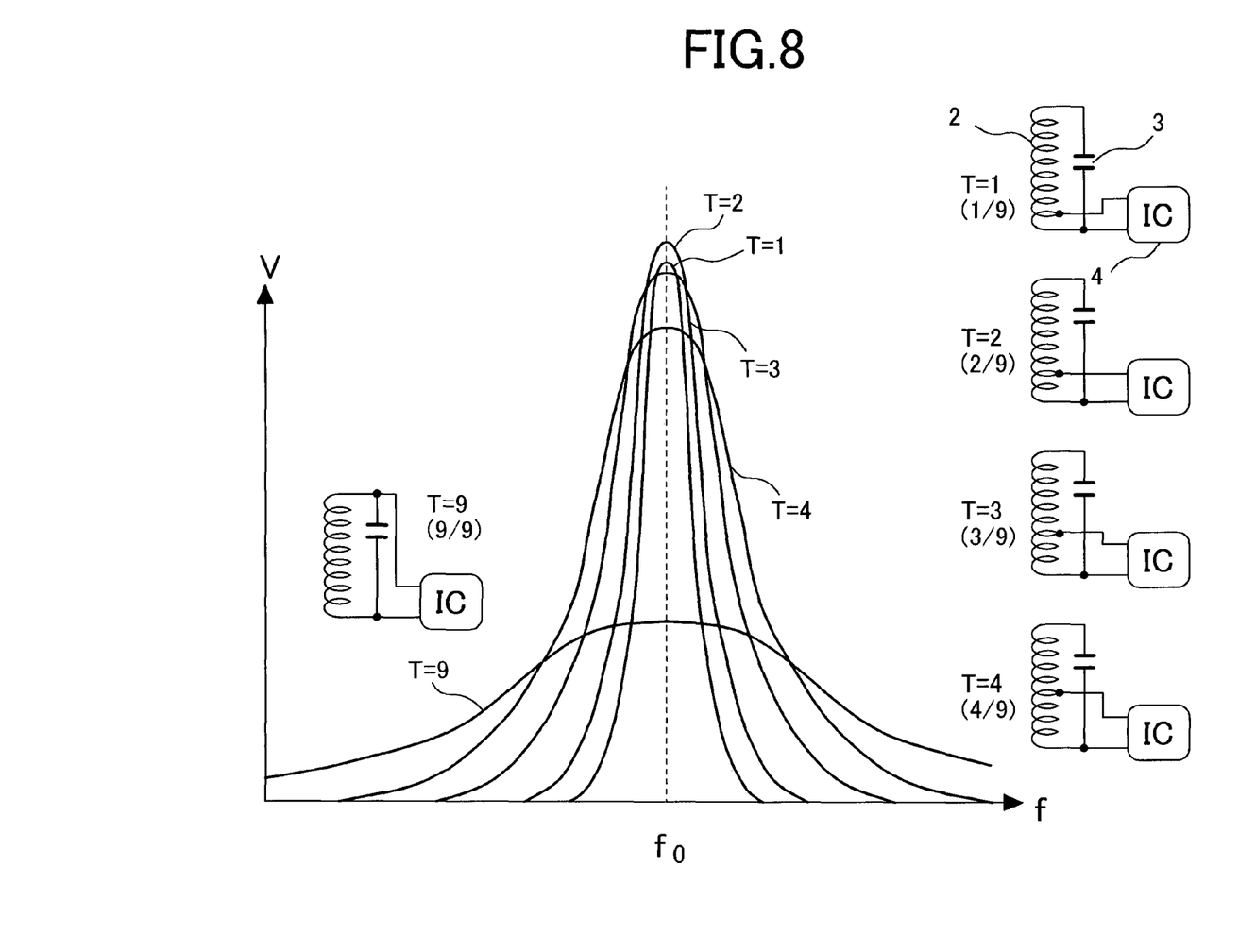
FIG. 8 is a view showing the frequency characteristic of input-ends voltage dependently on the position of the intermediate tap position of the antenna coil of the RFID mounted on the portable information device according to the present invention.

FIG. 8 is a schematic view of the frequency characteristic obtained by measuring change in the input-ends voltage V of the IC 4 in the case of connecting the resonance condenser 3 to both ends of the antenna coil 2 wherein the number of total turns was 9, at the time when an RFID was fitted to the battery receiving section 12 of the portable telephone 9 illustrated in FIG. 1B and the RFID had the structure illustrated in FIG. 3, and changing the tap position T of the antenna coil 2 connected to the IC 4, that is, the case of setting the ratio of T/N to T/9, changing T to 1, 2, 3, 4 and 9, adjusting the value of the resonance condenser 3 in each case to make the resonance frequency $f_0$ constant, and keeping the distance up to the external apparatus. Since the magnetic material sheet 5 was arranged proximately to the antenna coil 2, the L component (inductance) was substantially increased. Therefore, Q was larger than that in the case that there was no magnetic material sheet.

As is evident from FIG. 8, the following can be understood: as the value of the ratio of the number N of the total turns to the tap position T, N/T, is smaller, the damping effect of the input-impedance of the IC 4 on the resonance circuit is smaller so that the Q is higher; as the Q is made higher, the both-ends voltage V of the antenna coil 2 continuously becomes higher; the rise in the both-ends voltage V of the IC 4 is saturated at a certain ratio from relationship between energy which the IC 4 connected to the divided portion of the antenna coil 2 consumes and energy from the external apparatus, and then the voltage falls. It can be understood that in the case of FIG. 8, the voltage at the time of T=1 was smaller than that at the time of T=2.

When the Q becomes too high, the effect of the value error of the used parts on the resonance frequency becomes large. Thus, the industrial productivity becomes insufficient. For this reason as well as the above-mentioned reason, it is preferred that the ratio of the practical number of the turns to the tap position is within the range of 1/5 to 1/3.

About the taking-out of the tap of the antenna coil 2, in FIGS. 3 to 6, which show one schematic example, the number of the rectangular turns or windings of the antenna coil 2 is 7 and terminals of the IC are connected to the first and second turns or windings. That is, the figures show a case of the tap position/the number of the turns=2/7.

<Embodiment 2>

Figure 5:
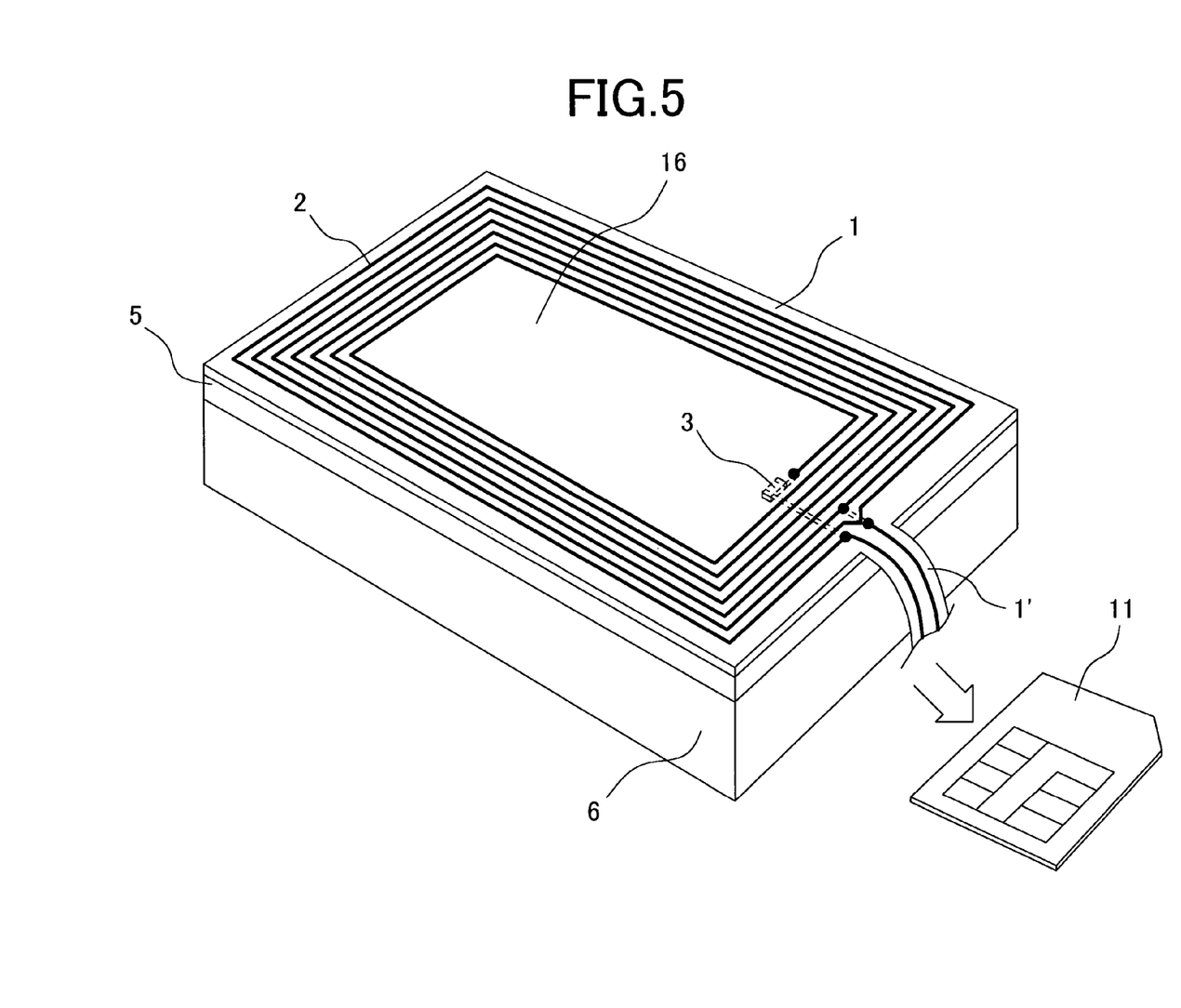
FIG. 5 is a view illustrating a second embodiment of the portable information device according to the present invention.

FIG. 5 is a view illustrating a second embodiment of the portable information device according to the present invention. For the convenience of description, to constituting parts equal to or similar to the constituting parts of the embodiment 1 described by use of FIGS. 1A to 5 are attached the same reference numbers, and detailed description thereof is omitted. In order to make the RFID portion easy to understand in the same manner as in FIG. 3, in the present embodiment the lower and upper side cases 21 and 22, the rotation axis 23 and the inner structure of the portable telephone 9 are omitted, and only an arrangement relationship between the battery 6 and parts which constitute the RFID is illustrated.

That is, the present embodiment is an embodiment corresponding to a contact and non-contact consolidated IC card using a flexible circuit-board 1' which is integrated with the substrate 1. The antenna coil 2 is connected to an IC card 11 or both of contact and non-contact uses, which is mounted on another place inside the portable telephone 9, through the flexible circuit-board 1' and through a non-illustrated connector. In this point, the present embodiment is different from the embodiment 1. Such a structure makes it possible to widen the permission range for the used IC 4. In other words, the present embodiment can cope with not only an IC for an RFID only for non-contact use but also an IC for both of contact and non-contact uses.

<Embodiment 3>

Figure 6:
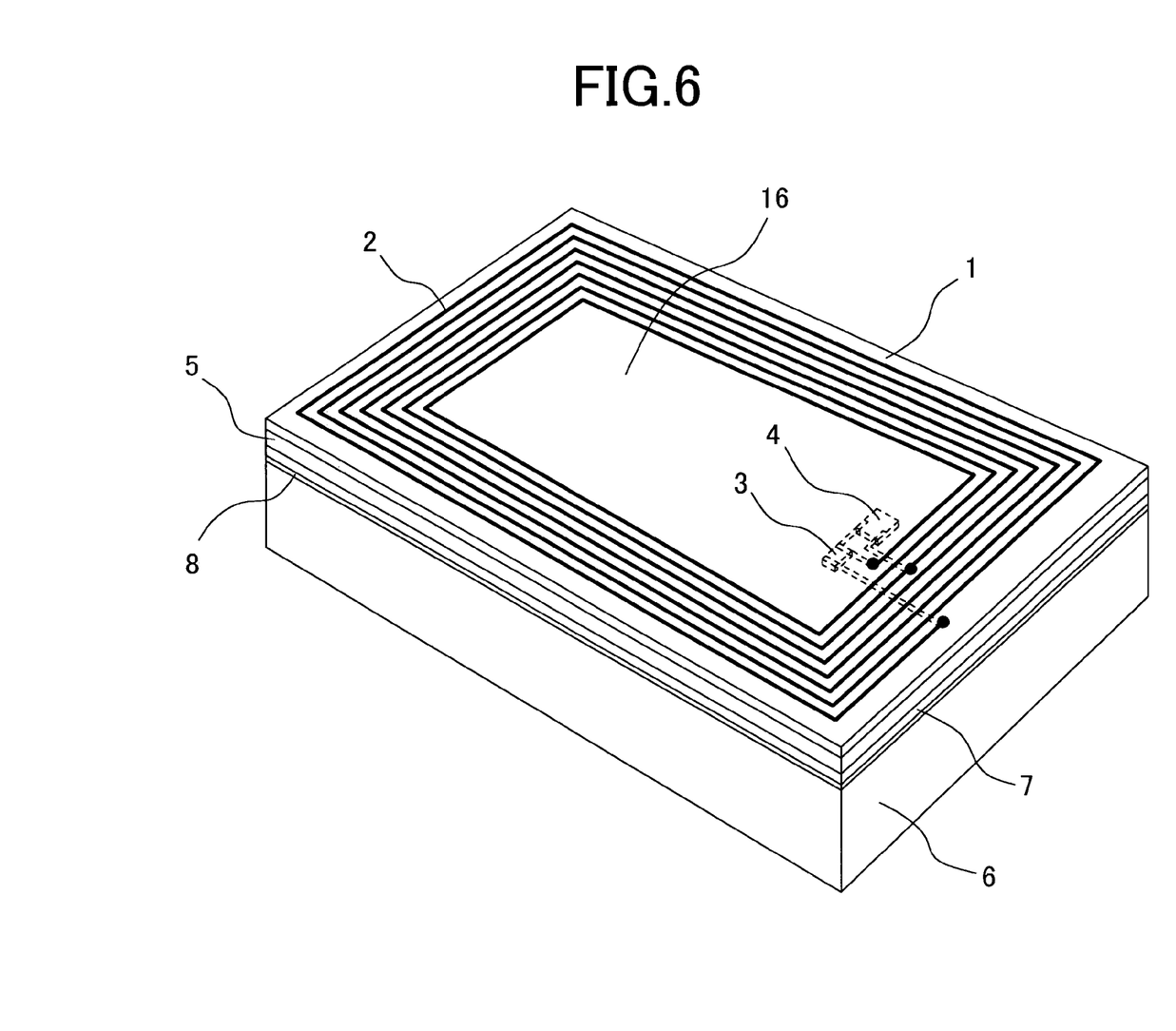
FIG. 6 is a view illustrating a third embodiment of the portable information device according to the present invention.

FIG. 6 is a view illustrating a third embodiment of the portable information device according to the present invention. For the convenience of description, to constituting parts equal to or similar to the constituting parts of the embodiment 1 described by use of FIGS. 1A to 5 are attached the same reference numbers, and detailed description thereof is omitted. In order to make the RFID portion easy to understand in the same manner as in FIG. 3, in the present embodiment the lower and upper side cases 21 and 22, the rotation axis 23 and the inner structure of the portable telephone 9 are omitted, and only an arrangement relationship between the battery 6 and parts which constitute the RFID is illustrated.

That is, the present embodiment is different from the embodiment 1 in the point that the present embodiment has a structure for making change in the resonance frequency, based on the individual variation and the charge state of the battery 6, still smaller. An aluminum foil 8 is adhered to the battery 6 side of a spacer 7, which is an insulator as an RFID cover.

Such a structure makes it possible to make the effect of the individual variation and the charge state of the battery 6 on the change in the resonance frequency $f_0$ still smaller. The thickness of the aluminum foil 8 affects the communication distance up to an external apparatus, and the communication distance is shorter as the thickness is larger. Therefore, the thickness is desirably 50 ìm or less, more desirably about 30 ìm. The aluminum foil 8 may be substituted with a metal vacuum-evaporation film having the above-mentioned thickness.

The above has described the preferred embodiments of the present invention, but the present invention is not limited to the above-mentioned embodiments. Of course, within the scope which does not depart from the present invention, various design modifications can be made. For example, the present invention can be applied, for example, to a PDA (personal digital assistant) having communication function besides any portable telephone.

According to the present invention, it is possible to lengthen the communication distance between an external apparatus and an RFID mounted inside a portable information device for which an EMC measure is taken.

Moreover, it becomes unnecessary that resonance frequencies of RFIDs are individually adjusted, and it is possible to provide a portable information device on which an RFID is mounted inexpensively.

What is claimed is:

1. A portable information device comprising:
   a case;
   electronic devices stored in the case;
   a flattened battery for supplying electric power to the portable information device, said battery being made of a metal material;
   a battery cover;
   an antenna coil formed on a substrate;
   a magnetic material sheet; and
   an IC and condensers for resonance connected to the antenna coil;
   wherein:
      the IC intercommunicates with an external apparatus through the antenna coil using a magnetic field,
      a depression serving as a battery receiving section is formed on a portion of the surface of the case and covered by the battery cover,
      the battery, the antenna coil, and the magnetic material sheet are stored in the depression,
      a metal vacuum-evaporation film or a conductive material coating is applied to the case,
      no metal vacuum-evaporation film or a conductive material coating is applied to the battery cover,
      the antenna coil is arranged between the battery cover and the battery, and
      the magnetic material sheet is arranged between the antenna coil and the battery within the depression.

2. A portable information device according to claim 1, wherein the antenna coil has an intermediate tap, the condensers for resonance are connected to both ends of the antenna coil, and the IC is connected to the middle between one of the ends of the antenna coil and the intermediate tap.

3. A portable information device according to claim 2, wherein the intermediate tap is an intermediate tap the number of turns of which is from 1/3 to 1/5 of the total number of turns of the antenna coil.

4. A portable information device according to claim 3, wherein the magnetic material sheet has an initial permeability of 10 or more and a thickness of 0.1 mm or more and 1.0 mm or less.

5. A portable information device according to claim 3, further having a metal foil or a metal vacuum-evaporation film between the magnetic material sheet and the battery.

6. A portable information device according to claim 3, further comprising an IC card, for both of-contact and non-contact uses, which is connected to the antenna coil through a flexible substrate and a connector and is mounted on a position different from the position of the antenna coil.

7. A portable information device according to claim 2, wherein the magnetic material sheet has an initial permeability of 10 or more and a thickness of 0.1 mm or more and 1.0 mm or less.

8. A portable information device according to claim 7, further comprising an IC card, for both contact and non-contact uses, which is connected to the antenna coil through a flexible substrate and a connector and is mounted on a position different from the position of the antenna coil.

9. A portable information device according to claim 2, further having a metal foil or a metal vacuum-evaporation film between the magnetic material sheet and the battery.

10. A portable information device according to claim 2, further comprising an IC card, for both contact and non-contact uses, which is connected to the antenna coil through a flexible substrate and a connector and is mounted on a position different from the position of the antenna coil.

11. A portable information device according to claim 1, wherein the magnetic material sheet has an initial permeability of 10 or more and a thickness of 0.1 mm or more and 1.0 mm or less.

12. A portable information device according to claim 11, further having a metal foil or a metal vacuum-evaporation film between the magnetic material sheet and the battery.

13. A portable information device according to claim 11, further comprising an IC card, for both contact and non-contact uses, which is connected to the antenna coil through a flexible substrate and a connector and is mounted on a position different from the position of the antenna coil.

14. A portable information device according to claim 1, further having a metal foil or a metal vacuum-evaporation film between the magnetic material sheet and the battery.

15. A portable information device according to claim 5, further comprising an IC card, for both contact and non-contact uses, which is connected to the antenna coil through a flexible substrate and a connector and is mounted on a position different from the position of the antenna coil.

* * * * *